(12) United States Patent
Huang

(10) Patent No.: US 9,500,329 B2
(45) Date of Patent: Nov. 22, 2016

(54) PEDESTAL, DISPLAY APPARATUS AND ILLUMINATION APPARATUS

(71) Applicants: BOE TECHNOLOGY GROUP CO., LTD., Beijing (CN); K-TRONICS (SUZHOU) TECHNOLOGY CO., LTD., Suzhou, Jiangsu Province (CN)

(72) Inventor: Wei Huang, Beijing (CN)

(73) Assignees: BOE TECHNOLOGY GROUP CO., LTD., Beijing (CN); K-TRONICS (SU ZHOU) TECHNOLOGY CO., LTD., Suzhou, Jiangsu Province (CN)

( * ) Notice: Subject to any disclaimer, the term of this patent is extended or adjusted under 35 U.S.C. 154(b) by 0 days.

(21) Appl. No.: 14/787,630

(22) PCT Filed: Apr. 21, 2015

(86) PCT No.: PCT/CN2015/077032
§ 371 (c)(1),
(2) Date: Oct. 28, 2015

(87) PCT Pub. No.: WO2016/045371
PCT Pub. Date: Mar. 31, 2016

(65) Prior Publication Data
US 2016/0252223 A1    Sep. 1, 2016

(30) Foreign Application Priority Data
Sep. 26, 2014 (CN) .................... 2014 2 0560690 U

(51) Int. Cl.
*F21S 6/00* (2006.01)
*G09F 15/00* (2006.01)

(52) U.S. Cl.
CPC .............. *F21S 6/002* (2013.01); *G09F 15/00* (2013.01)

(58) Field of Classification Search
CPC ................................ F21S 6/002; G09F 15/00
See application file for complete search history.

(56) References Cited

U.S. PATENT DOCUMENTS

| 4,216,632 A | 8/1980 | Mack |
| 6,450,828 B1 * | 9/2002 | Gordon .............. B60R 11/0235 348/E5.128 |
| 8,684,571 B1 | 4/2014 | Alaura et al. |
| 2014/0332643 A1 * | 11/2014 | Suzuki ................... F16M 11/08 248/125.7 |

FOREIGN PATENT DOCUMENTS

| CN | 201041750 Y | 3/2008 |
| CN | 201166330 Y | 12/2008 |

(Continued)

OTHER PUBLICATIONS

International Search Report and Written Opinion both dated Jul. 20, 2015; PCT/CN2015/077032.

*Primary Examiner* — Mary Ellen Bowman
(74) *Attorney, Agent, or Firm* — Ladas & Parry LLP

(57) ABSTRACT

A pedestal comprising a support (1) and a pedestal body (2). The support (1) includes a cylindrical upright column (11) for connecting with the pedestal body (2). At least one slot (111) is provided on a wall of the cylindrical upright column (11) and extends along a circumferential direction of the wall, and a gap (112) communicating with an end face of the wall is provided on the respective slots. A limit projection (113) is provided at an inner side of the wall. A groove (21) matching with the cylindrical upright column (11) is provided on the pedestal body (2). A clamping hook (211) for engaging with the slot (111) is provided on a side wall of the groove (21). A spring strip (212) is provided on a bottom surface of the groove (21). A protrusion (213) for engaging with the limit projection (113) is provided on the spring strip (212). A via hole (214) passing through a thickness of the pedestal body (2) is provided on the bottom surface of the groove (21), and the via hole (214) abuts on the spring strip (212). The pedestal is used for support a display device or lamp. The difficulty in assembling and disassembling of the support and the pedestal body can be overcome. A display apparatus and an illumination apparatus which comprise the pedestal are further provided.

12 Claims, 4 Drawing Sheets

(56) References Cited

FOREIGN PATENT DOCUMENTS

| | | |
|---|---|---|
| CN | 201651686 U | 11/2010 |
| CN | 201688349 U | 12/2010 |
| CN | 201688350 U | 12/2010 |
| CN | 204062379 U | 12/2014 |
| EP | 1762782 A3 | 5/2008 |
| GB | 2507811 A | 5/2014 |
| WO | 95/28600 A1 | 10/1995 |

* cited by examiner

US 9,500,329 B2

PEDESTAL, DISPLAY APPARATUS AND ILLUMINATION APPARATUS

TECHNICAL FIELD

Embodiments of the present disclosure relate to a pedestal, a display apparatus and an illumination apparatus.

BACKGROUND

Currently, a pedestal of a display apparatus comprises a support and a pedestal body. The support is installed on the pedestal body, a display device is installed on the support, and the support and the pedestal body are fixedly attached together by screws.

SUMMARY

One embodiment of the present disclosure provides a pedestal, comprising a support and a pedestal body, wherein, the support includes a cylindrical upright column, a slot is provided on a wall of the cylindrical upright column and extends along a circumferential direction of the wall, a gap communicating with an end face of the wall is provided on the slot, and a limit projection is provided at an inner side of the wall; a groove matching with the cylindrical upright column is provided on the pedestal body, a clamping hook for engaging with the slot is provided on a side wall of the groove, a spring strip is provided on a bottom surface of the groove, a protrusion for engaging with the limit projection is provided on the spring strip, a via hole passing through a thickness of the pedestal body is provided on the bottom surface of the groove, and the via hole abuts on the spring strip.

Another embodiment of the present disclosure provides a display apparatus, comprising the above-described pedestal, and a display device installed on the pedestal.

Still another embodiment of the present disclosure provides an illumination apparatus, comprising: the above-described pedestal, and a lamp installed on the pedestal.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

REFERENCE SIGNS

1—support;
11—wall, 12—connection handle;
111—slot, 112—gap, 113—limit projection, 114—reinforcing rib, 115—second side opening, 116—cylindrical structure;
2—pedestal body;
21—groove;
211—clamping hook, 212—spring strip, 213—protrusion, 214—via hole, 215—first side opening, 216—cylindrical projection.

DETAILED DESCRIPTION

Hereinafter, the technical solutions of the embodiments of the present disclosure will be described in a clearly and fully understandable way in conjunction with the drawings related to the embodiments of the present disclosure. It is obvious that the described embodiments are just part of but not all of the embodiments of the present disclosure. Based on the described embodiments herein, those skilled in the art can obtain other embodiment(s), without any inventive work, which should be within the scope of the present disclosure.

The inventor finds that: the prior art at least has following problems: because a support and a pedestal body of a display apparatus are fixedly attached together by screws as connector, disassembly and assembly between the support and the pedestal body in the display apparatus are relatively complicated and difficult.

The embodiments of the present disclosure provide a pedestal, a display apparatus and an illumination apparatus, which can solve the problem of difficulty in disassembly and assembly between the support and the pedestal body of the pedestal.

With reference to FIG. 1 to FIG. 6, this embodiment provides a pedestal, comprising a pedestal body 2 and a support 1 configured to be installed onto the pedestal body 2.

Figure 1:
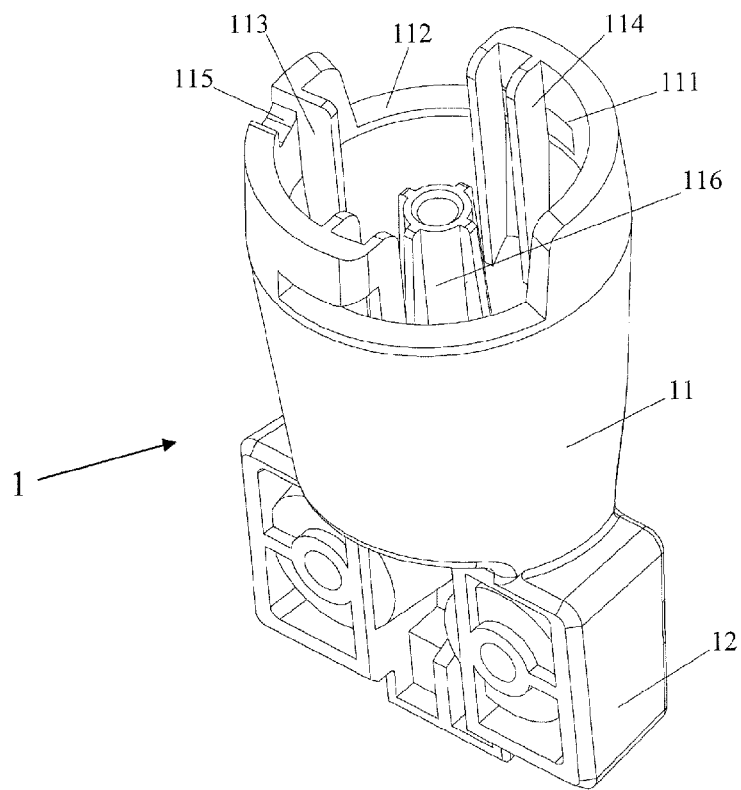
FIG. 1 is a schematic diagram of a support provided by an embodiment of the present disclosure.
Figure 2:
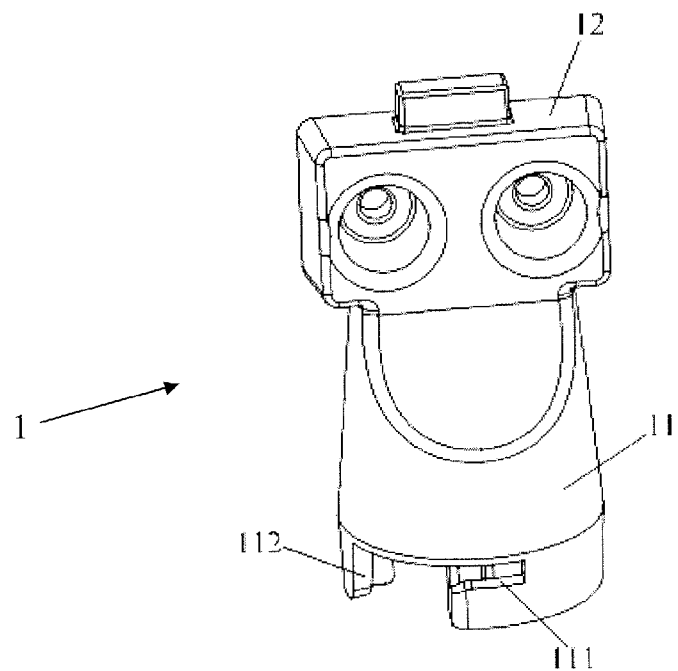
FIG. 2 is another schematic diagram of the support provided by the embodiment of the present disclosure.
Figure 3:
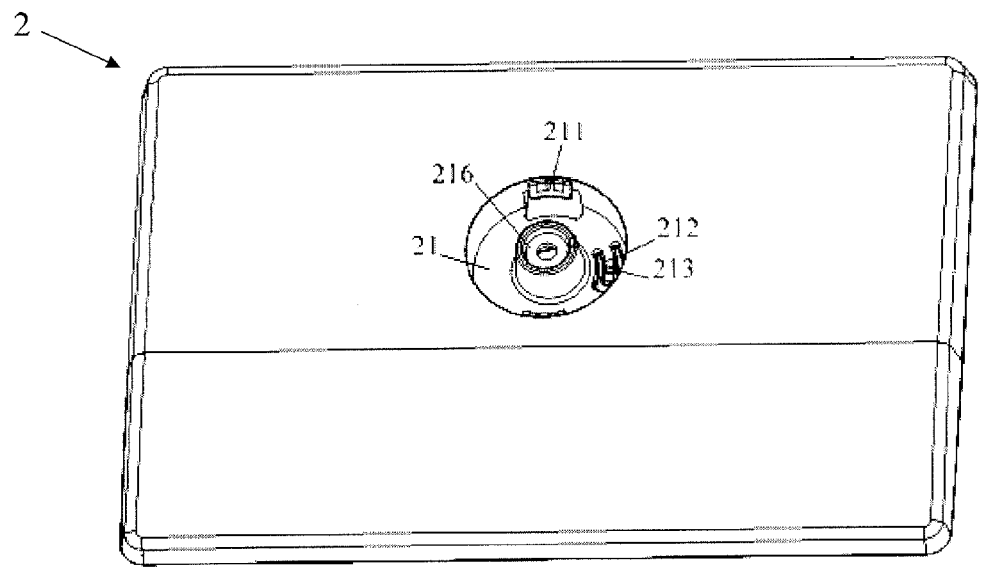
FIG. 3 is a top view of a pedestal body provided by the embodiment of the present disclosure.
Figure 4:
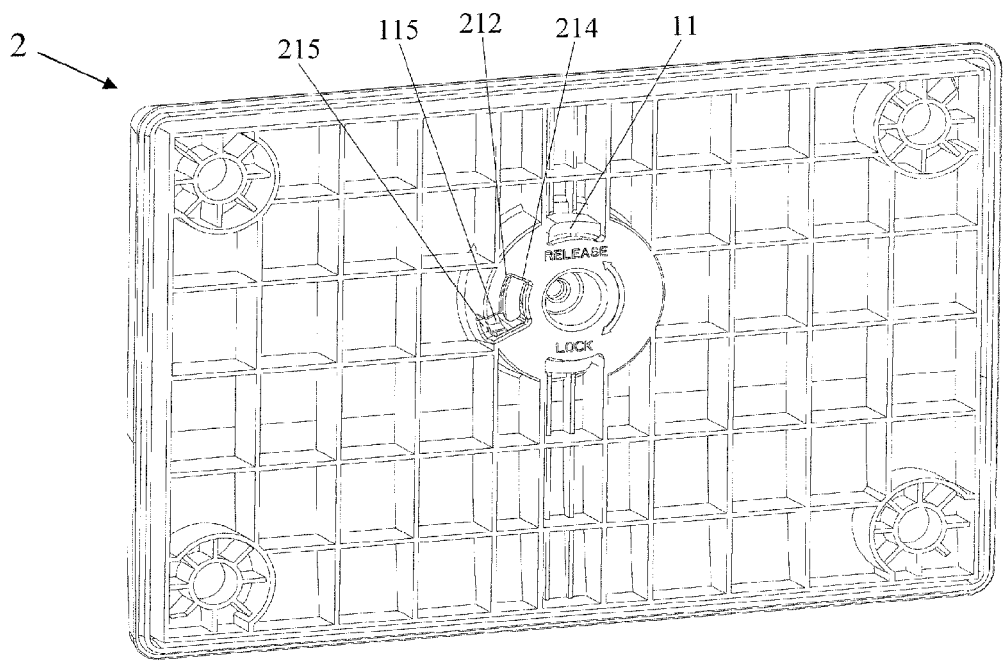
FIG. 4 a bottom view of the pedestal body provided by the embodiment of the present disclosure.

With reference to FIG. 1 and FIG. 2, the support 1 includes a cylindrical upright column 11 for connecting with the pedestal body 2, at least one slot 111 is provided on a wall 11 of the cylindrical upright column 11. The at least one slot 111 extends along a circumferential direction of the wall 11 and passes through a thickness of the wall 11. A gap 112 is provided thereon each of the slots 111. The gap 112 communicates with an end face of the wall 11; and a limit projection 113 projecting toward a central axis of the upright column is provided at an inner side of the wall 11;

With reference to FIG. 3 and FIG. 4, a groove 21 matching with the cylindrical upright column 11 is provided on the pedestal body 2. The groove 21 is configured to accommodate at least a portion of the cylindrical upright column 11. At least one clamping hook 211 is provided on a side wall of the groove 21 and respectively engaged with the respective slots 111. A spring strip 212 is provided on a bottom surface of the groove 21; and a protrusion 213 is provided on the spring strip 212 for engaging with the limit projection 113. The protrusion 213, for example, is disposed on a free end of the spring strip 212. A via hole 214 passing through a thickness of the pedestal body 2 is provided on a bottom surface of the groove 21, and the via hole 214 abuts on the spring strip 212. The spring strip 212 can be pulled out through the via hole 214 so as to release the limit projection 113. In this embodiment, the via hole 214 is opposite to the spring strip 212. Herein, the expression "the via hole 214 is opposite to the spring strip 212" refers to a case where the via hole 214 surrounds a side edge of the spring strip 212.

Figure 7:
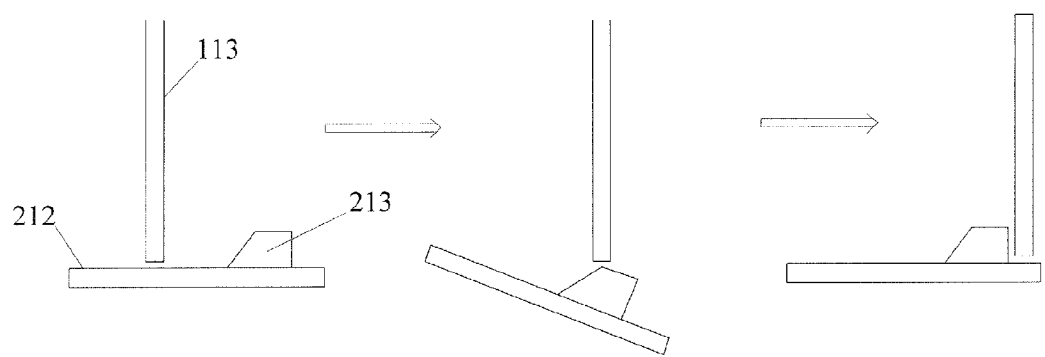
FIG. 7 is a schematic diagram showing an engagement process of a limit projection and a protrusion according to the embodiment of the present disclosure.

In the pedestal provided by this embodiment, by engagement between the slot 111 and the clamping hook 211, and engagement between the limit projection 113 and the protrusion 213, detachable connection between the support 1 and the pedestal body 2 can be implemented. For example, during assembling, the end of the support 1 provided with the gap 112 is inserted into the groove 21, and synchronously, the clamping hook 211 is inserted the gap 112. The support 1 is rotated, in an extension direction from the slot 111 to the gap 112; or the pedestal body 2 is rotated, in an extension direction from the gap 112 to the slot 111, so that the clamping hook 211 enters the slot 111 and is engaged with the slot 111. During rotation, with reference to FIG. 7, the limit projection 113 comes into contact with the protrusion 213 and push the protrusion 213; Because the protrusion 213 is disposed on the free end of the spring strip 212, when the limit projection 113 applies a force to the protrusion 213, the spring strip 212 bends synchronously, and the protrusion 213 is tilted with respect to the limit projection 113 until the limit projection 113 crosses the protrusion 213, the spring strip 212 restores to an initial state, and the protrusion 213 and the limit projection 113 are engaged; when the clamping hook 211 is located in a rotation stop position in the slot 111, the limit projection 113 just crosses the protrusion 213 and abuts against the protrusion 213, so as to implement secure installation of the support 1 and the pedestal body 2. Thus, when the support 1 is installed onto the pedestal body 2, the clamping hook 211 and the protrusion 213 of the pedestal body 2 restrict the rotation freedom of the support 1 in a forward direction and in a reverse direction; likewise, the slot 111 and the limit projection 113 of the support 1 restrict the rotation freedom of the pedestal body 2 in a forward direction and in a reverse direction. In addition, during usage, the engaging mode of the slot 111 and the clamping hook 211 can further ensure that the end of the support 1 provided with the gap 112 is kept within the groove 21, and an axial position of the support 1 is fixed.

During disassembling, the free end of the spring strip 212 is pulled out through the via hole 214 to make the spring strip 212 bend, so that the protrusion 213 is tilted and separated from the projection 113. In this circumstance, the support 1 or the pedestal body 2 is rotated to make the limit projection 113 cross the protrusion 213, so that the clamping hook 211 is disengaged from the slot 111, and the support 1 and the pedestal body 2 are detached from each other, so as to complete the disassembly. It should be noted that, in order to reduce costs, the via hole 214 can merely be opposite to the free end of the spring strip 212, that is, the via hole 214 only surrounds the free end of the spring strip 212, as long as the spring strip 212 can be pulled out.

Thus, in the pedestal according to this embodiment, due to the engagement between the slot 111 and the clamping hook 211 and the engagement between the limit projection 113 and the protrusion 213, the disassembling of the support 1 from the pedestal body 2 is more convenient, which eliminates many complicated problems caused by screw connection.

With reference to FIG. 2, in the case that the number of the slots 111 is two, the two slots 11 are distributed symmetrically with respect to a central axis of the cylindrical upright column as a symmetry axis, so as to strengthen the balance of the support 1 on the pedestal body 2. Further, when the number of the slots 111 is three, the three slots 111 can be distributed in a form of an equiangular triangle on a plane view of the wall 11; when the number of the slots 111 is four, the four slots 111 can be distributed in a form of an equilateral rectangle on a plane view of the wall 11; and so on. In addition, when the number of the slots 111 is two, the limit projection 113 is located between the two slots 111; when the number of the slots 111 is two or more, the number of the limit projections 113 can be one or more; and when the number of the limit projections 113 is more than one, the slot 111 and the limit projection 113 are disposed alternately.

With reference to FIG. 1, in order to strengthen intensity of one end of the wall 11 provided with the slot 111, a reinforcing rib 114 is disposed in a region at the inner side of the wall 11 corresponding to the slot 111. The reinforcing rib 114 extends from the portion of wall 11 located above the slot 111 to the portion of the wall 11 located below the slot 111, and between the two portion, the reinforcing rib 114 crosses the slot 111. In addition, in the case that the support 1 and the pedestal body 2 are assembled, if there is a gap between an outer circumference of the cylindrical upright column and an inner circumference of the groove 21, cooperation between the reinforcing rib 114 and the clamping hook 211 can restrict radial movement of the cylindrical upright column in the groove 21, so that the engagement between the slot 111 and the clamping hook 211 is more stable.

Figure 5:
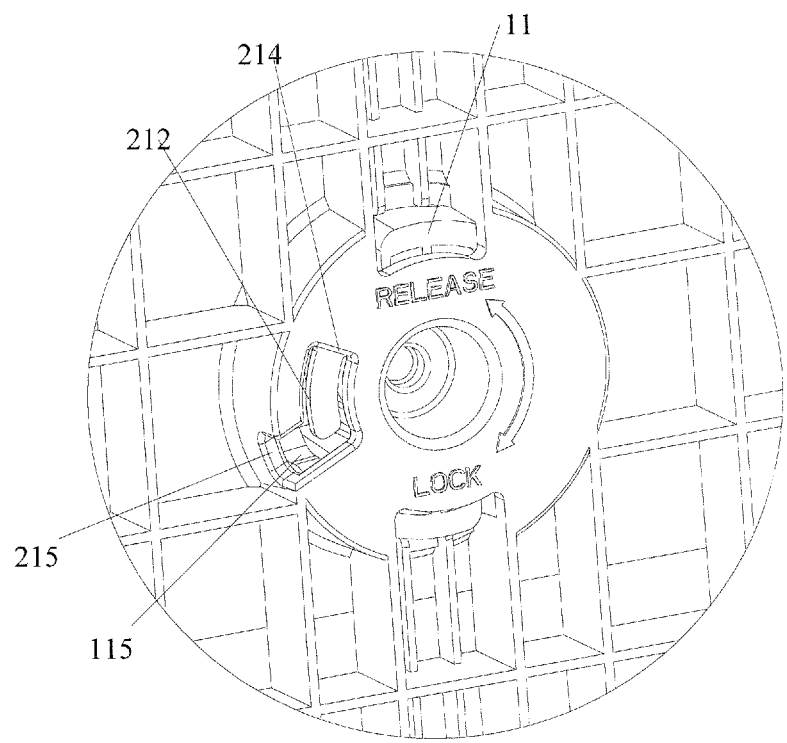
FIG. 5 is a partially enlarged view of the pedestal body in FIG. 4.
Figure 6:
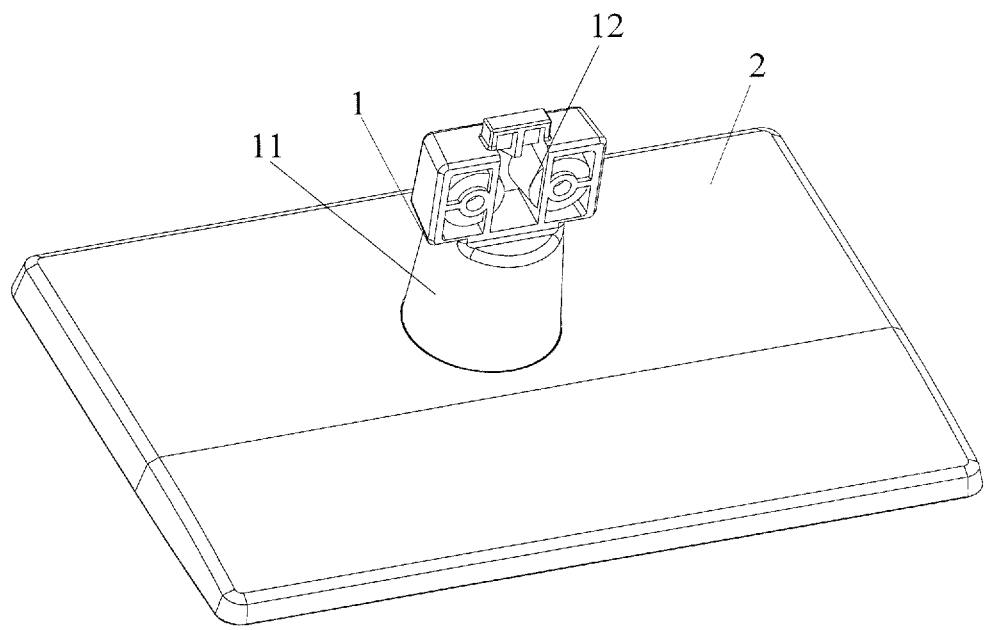
FIG. 6 is a schematic diagram of a state of the support assembled to the pedestal body provided by the embodiment of the present disclosure.

With reference to FIG. 4, during disassembling the support 1 from the pedestal, firstly, the spring strip 212 is pulled out through the via hole 214, so that the spring strip 212 is bended and the protrusion 213 is tilted; then, the support 1 or the pedestal body 2 is rotated to make the limit projection 113 cross the protrusion 213, so that the clamping hook 211 is disengaged from the slot 111, and the support 1 and the pedestal body 2 are detached from each other, so as to complete the disassembly. With reference to FIG. 5, in order to facilitate the disassembly procedure, a first side opening 215 communicating with the via hole 214 and extending to the side wall of the groove 21 is provided on the pedestal body 2; a second side opening 115 is provided in a region of the wall 11 corresponding to the first side opening 215. Therefore, in the case that the support 1 and the pedestal body 2 are assembled, the first side opening 215 and the second side opening 115 are correspondingly aligned. During disassembling, the spring strip 212 can be pulled out through a disassembly gap formed by the via hole 214, the first side opening 215 and the second side opening 115 which are communicating with each other. Thus, the spring strip 212 is pulled out more easily.

With reference to FIG. 1 and FIG. 3, in order to further strengthen intensity of assembling the support 1 and the pedestal body 2, a cylindrical structure 116 made of plastic material is disposed in a center of the cylindrical upright column. A cylindrical projection 216 matching with the cylindrical structure 116 is disposed in a center of the groove 21. A screw hole is disposed in a center of the cylindrical projection 216, and a screw passing through the screw hole is fixedly connected with the cylindrical structure 116.

With reference to FIG. 1, the support 1 is installed onto the pedestal body 2; the display device is installed on the support 1. A connection handle 12 for connecting with the display device is disposed on the end of the cylindrical upright column away from the pedestal body 2, so as to install the display device on the support 1.

An embodiment of the present disclosure further provides a display apparatus, comprising: the above-described pedestal and a display device installed on the pedestal. The display device may be connected to a connection handle 12 on the support 1 by screws. The display apparatus can be, for example, a liquid crystal display apparatus, an organic light-emitting diode (OLED) display apparatus or a television.

An embodiment of the present disclosure further provides an illumination apparatus, comprising: the above-described pedestal, and a lamp installed on the pedestal. The lamp can be connected, for example with a connection handle 12 on the support 1 by screws. The illumination apparatus can be, for example, a desk lamp, an indicator lamp, a searchlight or a signal lamp.

According to the above description, the embodiments of the present disclosure may at least provide structures of:

(1) A pedestal comprising a support and a pedestal body, wherein, the support includes a cylindrical upright column, a slot is provided on a wall of the cylindrical upright column and extends along a circumferential direction of the wall, a gap communicating with an end face of the wall is provided on the slot, and a limit projection is provided at an inner side of the wall;

a groove matching with the cylindrical upright column is provided on the pedestal body, a clamping hook for engaging with the slot is provided on a side wall of the groove, a spring strip is provided on a bottom surface of the groove, a protrusion for engaging with the limit projection is provided on the spring strip, a via hole passing through a thickness of the pedestal body is provided on the bottom surface of the groove, and the via hole abuts on the spring strip.

(2) The pedestal according to (1), wherein, the via hole is at least opposite to a free end of the spring strip.

(3) The pedestal according to (1) or (2), wherein, the support and the pedestal body are configured so that the limit projection across the protrusion abuts against the protrusion, in a state that the clamping hook is located in a rotation stop position in the slot.

(4) The pedestal according to any one of (1) to (3), wherein, the number of the slots is two, and the slots are distributed symmetrically with respect to a central axis of the cylindrical upright column as a symmetry axis.

(5) The pedestal according to (4), wherein, the limit projection is located between the two slots.

(6) The pedestal according to any one of (1) to (3), wherein, the number of the slots is more than one, and the slots are distributed symmetrically with respect to the central axis of the cylindrical upright column as the symmetry axis; the number of the limit projection is more than one, and the limit projections and the slots are disposed alternately.

(7) The pedestal according to any one of (1) to (6), wherein, a reinforcing rib is disposed in a region corresponding to the slot at an inner side of the wall so as to strengthen intensity of the slot.

(8) The pedestal according to any one of (1) to (7), wherein, a first side opening communicating with the via hole is provided on the pedestal body, and a second side opening corresponding to the first side opening is provided in a region of the wall.

(9) The pedestal according to any one of (1) to (8), wherein, a cylindrical structure made of plastic material is disposed in a center of the cylindrical upright column, a cylindrical projection for matching with the cylindrical structure is disposed in a center of the groove, and the cylindrical projection and the cylindrical structure are configured to be able to be connected with each other fixedly.

(10) The pedestal according to any one of (1) to (9), wherein, a connection handle for connecting with a display device is disposed on an end of the cylindrical upright column away from the pedestal body.

(11) A display apparatus, comprising: the pedestal according to any one of (1) to (10), and a display device installed on the pedestal.

(12) An illumination apparatus, comprising: the pedestal according to any one of (1) to (10), and a lamp installed on the pedestal.

Although the embodiment of the present disclosure has been described above in great detail with general descriptions and specific embodiments, on the basis of the embodiment of the present disclosure, various changes and improvements may be made, which is apparent to those skilled in the art. Therefore, the amendments or improvements made on the present disclosure without departing from the spirit of the present disclosure should be within the scope of the present disclosure.

The present application claims priority of Chinese Patent Application No. 201420560690.1 filed on Sep. 26, 2014, the disclosure of which is incorporated herein by reference in its entirety as part of the present application.

The invention claimed is:

1. A pedestal comprising a support and a pedestal body, wherein, the support includes a cylindrical upright column, at least one slot is provided on a wall of the cylindrical upright column and extends along a circumferential direction of the wall, a gap communicating with an end face of the wall is provided on the at least one slot, and at least one limit projection is provided at an inner side of the wall;

a groove matching with the cylindrical upright column is provided on the pedestal body, a clamping hook for engaging with the at least one slot is provided on a side wall of the groove, a spring strip is provided on a bottom surface of the groove, a protrusion for engaging with the at least one limit projection is provided on the spring strip, a via hole passing through a thickness of the pedestal body is provided on the bottom surface of the groove, and the via hole abuts on the spring strip.

2. The pedestal according to claim 1, wherein, the via hole is at least opposite to a free end of the spring strip.

3. The pedestal according to claim 1, wherein, the support and the pedestal body are configured so that the at least one limit projection across the protrusion abuts against the protrusion, in a state that the clamping hook is located in a rotation stop position in the at least one slot.

4. The pedestal according to claim 1, wherein, the at least one slot includes two slots, and the slots are distributed symmetrically with respect to a central axis of the cylindrical upright column as a symmetry axis.

5. The pedestal according to claim 4, wherein, the limit projection is located between the two slots.

6. The pedestal according to claim 1, wherein, the at least one slot includes a plurality of slots, and the slots are distributed symmetrically with respect to the central axis of the cylindrical upright column as the symmetry axis; the at least one limit projection includes a plurality of limit projections, and the limit projections and the slots are disposed alternately.

7. The pedestal according to claim 1, wherein, a reinforcing rib is disposed in a region corresponding to the at least one slot at an inner side of the wall so as to strengthen intensity of the at least one slot.

8. The pedestal according to claim 1, wherein, a first side opening communicating with the via hole is provided on the pedestal body, and a second side opening corresponding to the first side opening is provided in a region of the wall.

9. The pedestal according to claim 1, wherein, a cylindrical structure made of plastic material is disposed in a center of the cylindrical upright column, a cylindrical projection for matching with the cylindrical structure is disposed in a center of the groove, and the cylindrical projection and the cylindrical structure are configured to be able to be connected with each other fixedly.

10. The pedestal according to claim 1, wherein, a connection handle for connecting with a display device is disposed on an end of the cylindrical upright column away from the pedestal body.

11. A display apparatus, comprising: the pedestal according to claim 1, and a display device installed on the pedestal.

12. An illumination apparatus, comprising: the pedestal according to claim 1, and a lamp installed on the pedestal.

* * * * *